June 17, 1941.   D. W. WILSON   2,246,026
HEATING APPARATUS
Filed March 14, 1932   8 Sheets-Sheet 1
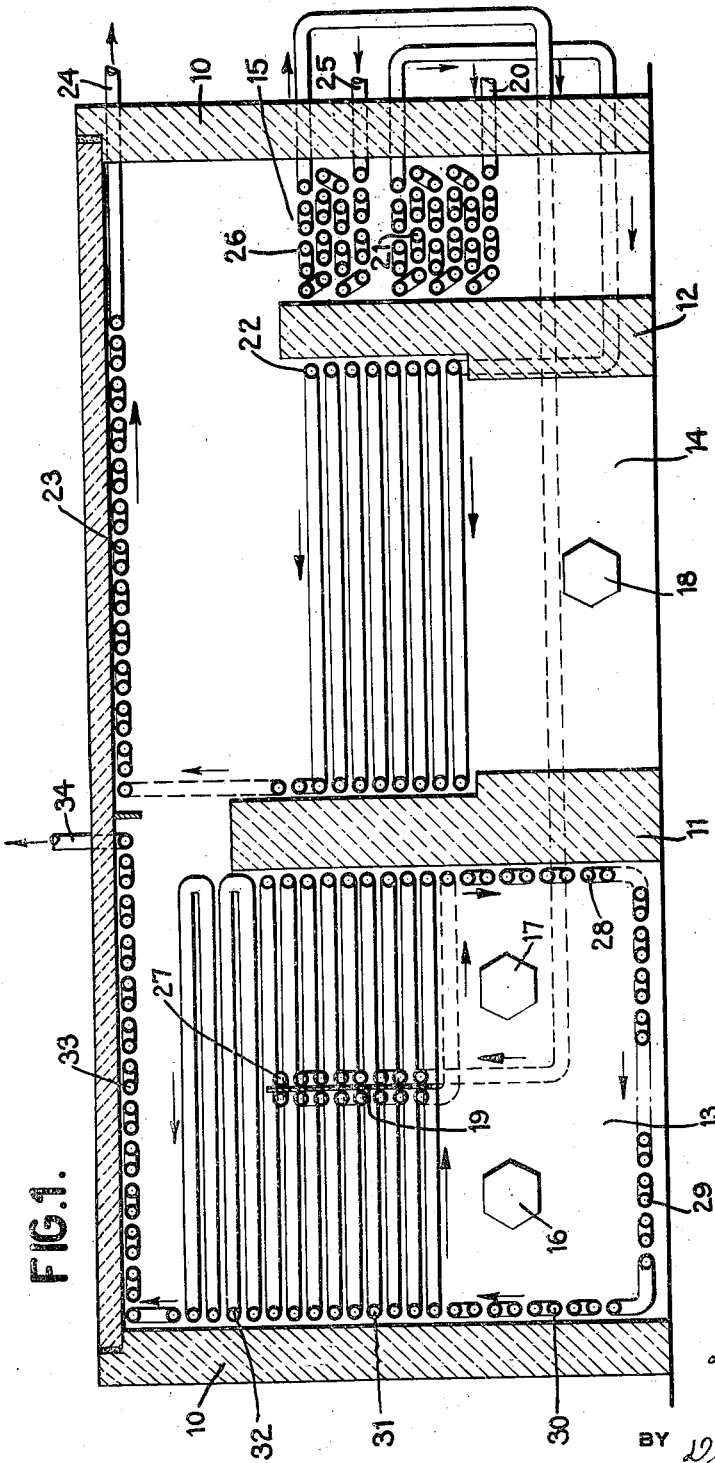
Dustin W. Wilson
INVENTOR-
BY Donald H. Mace
ATTORNEY-

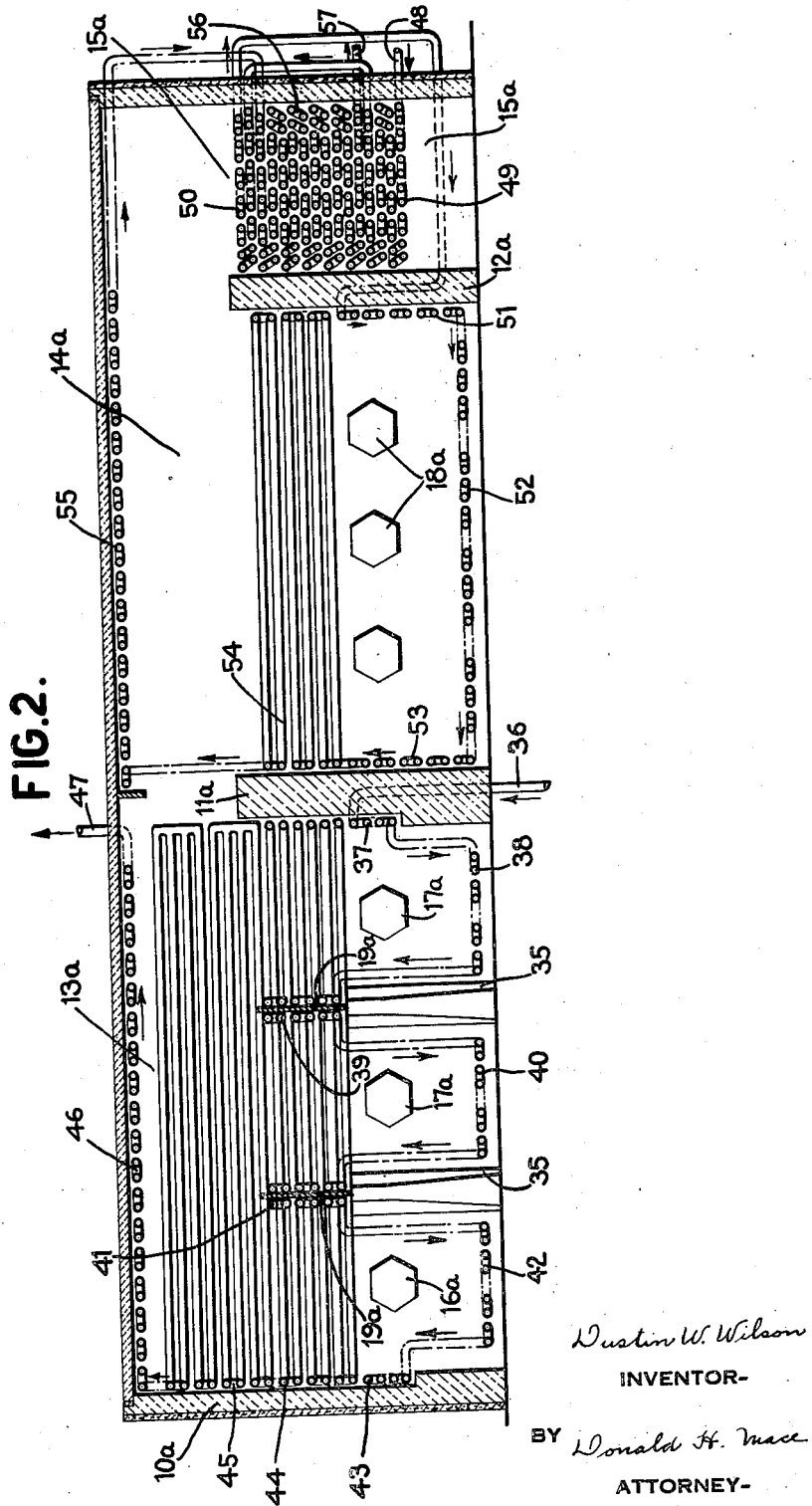

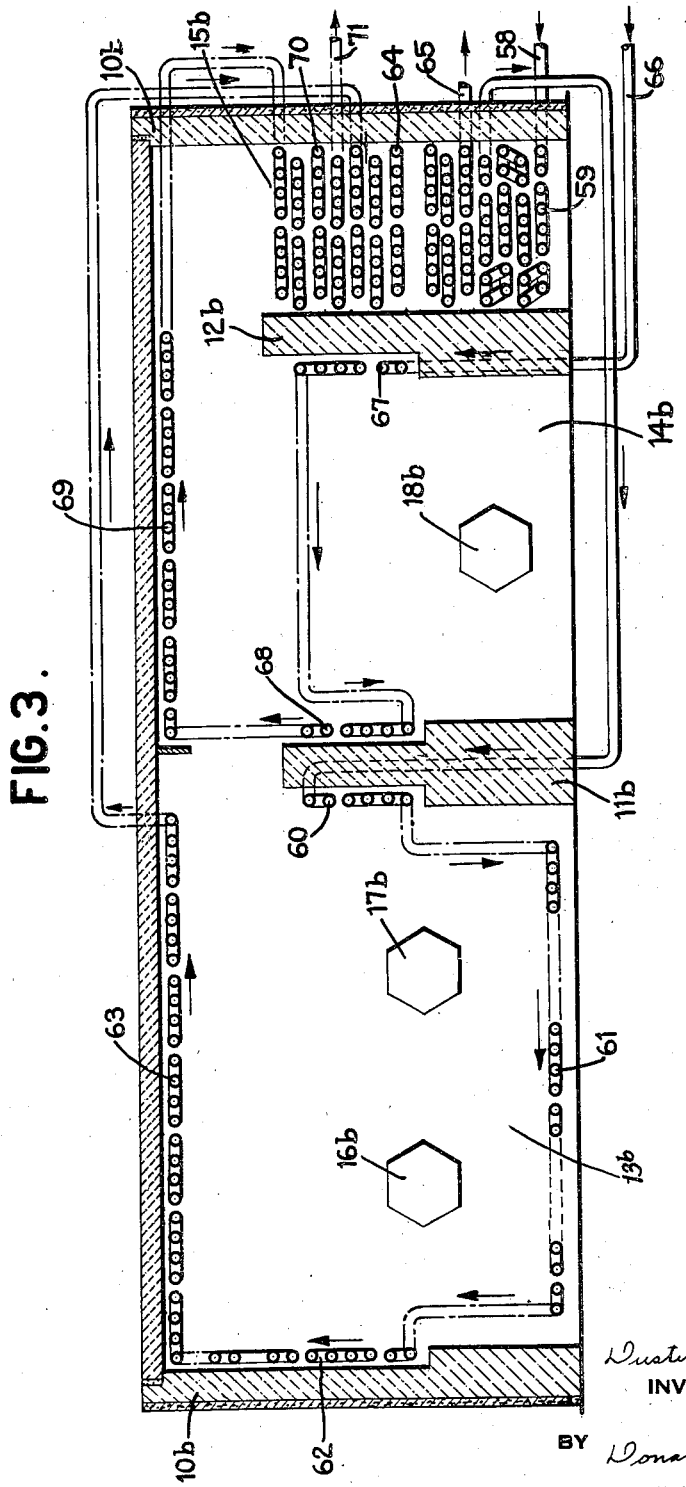

June 17, 1941.  D. W. WILSON  2,246,026
HEATING APPARATUS
Filed March 14, 1932   8 Sheets-Sheet 4
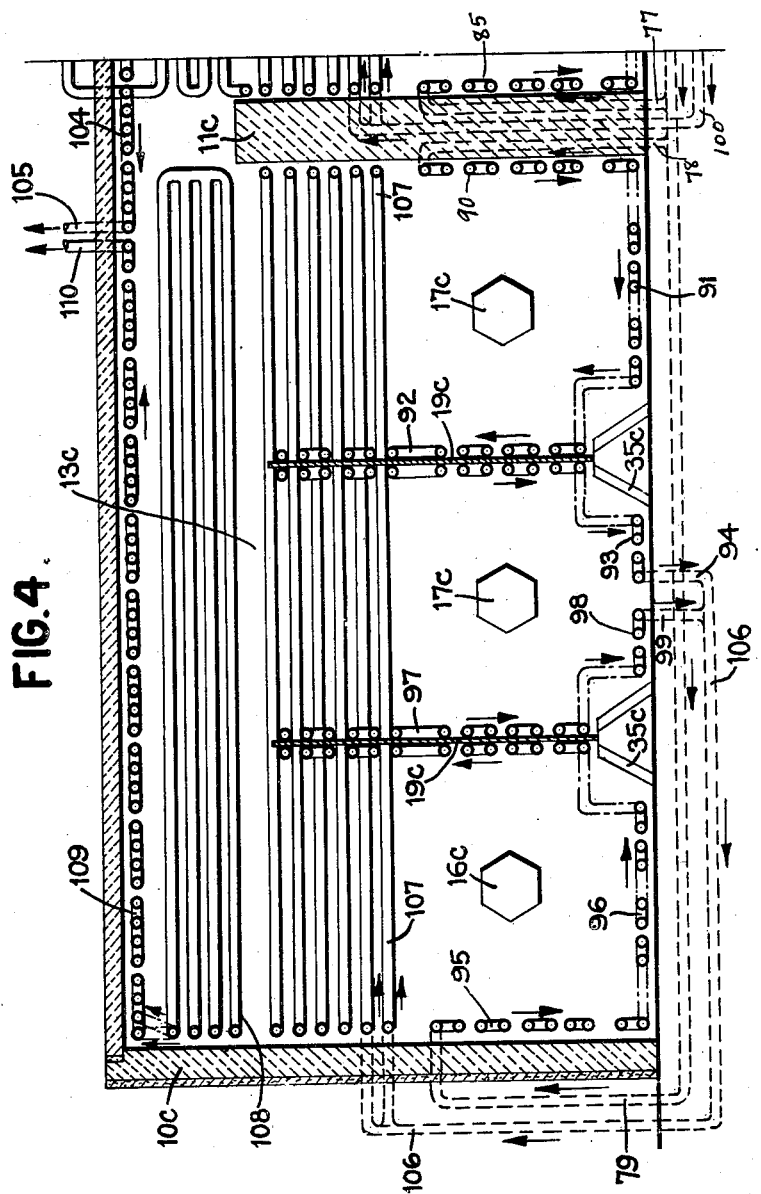

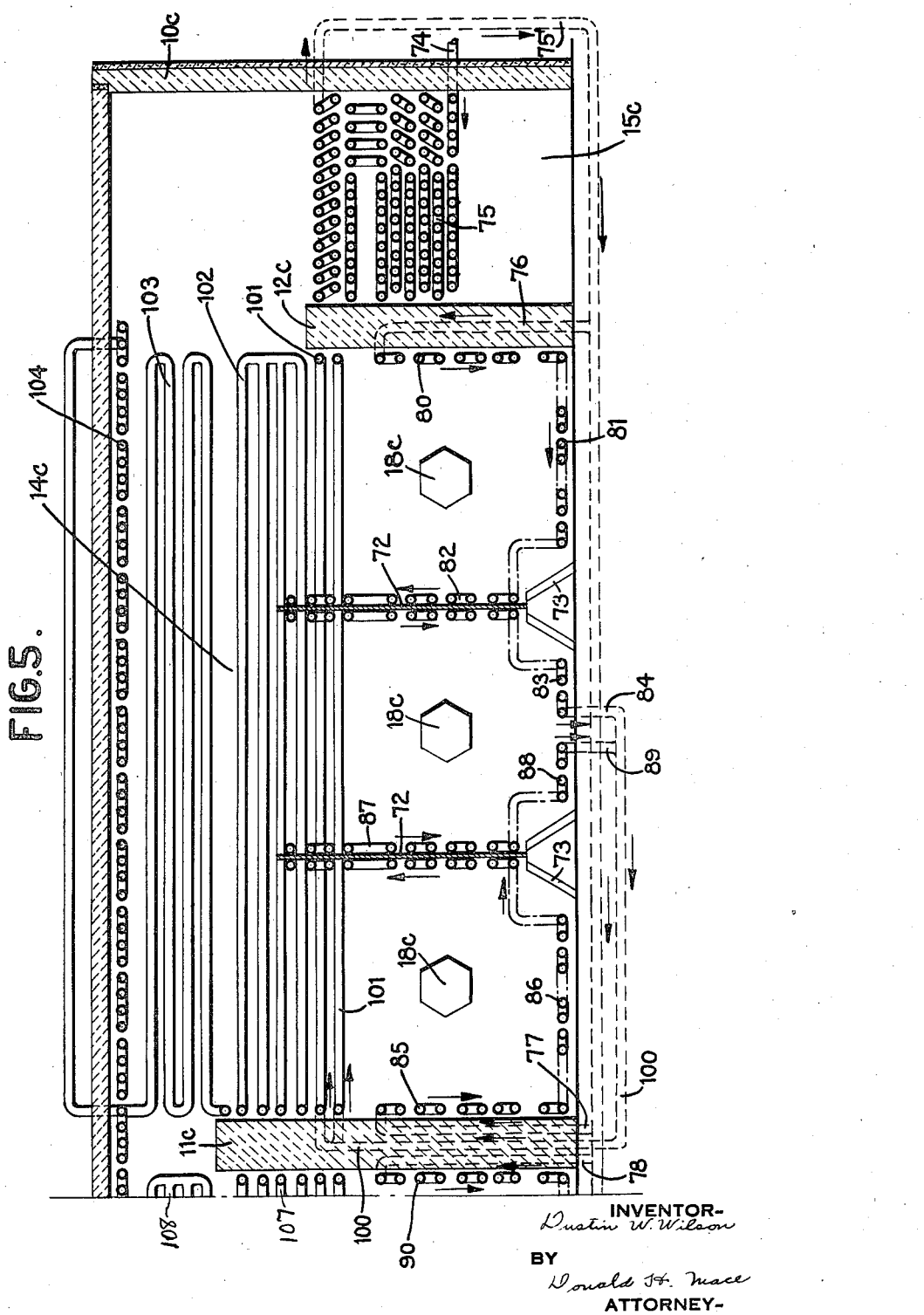

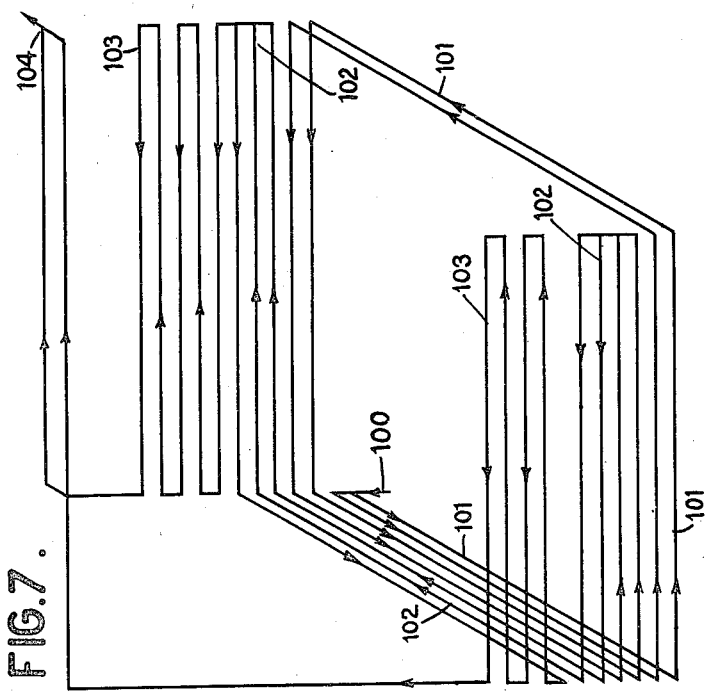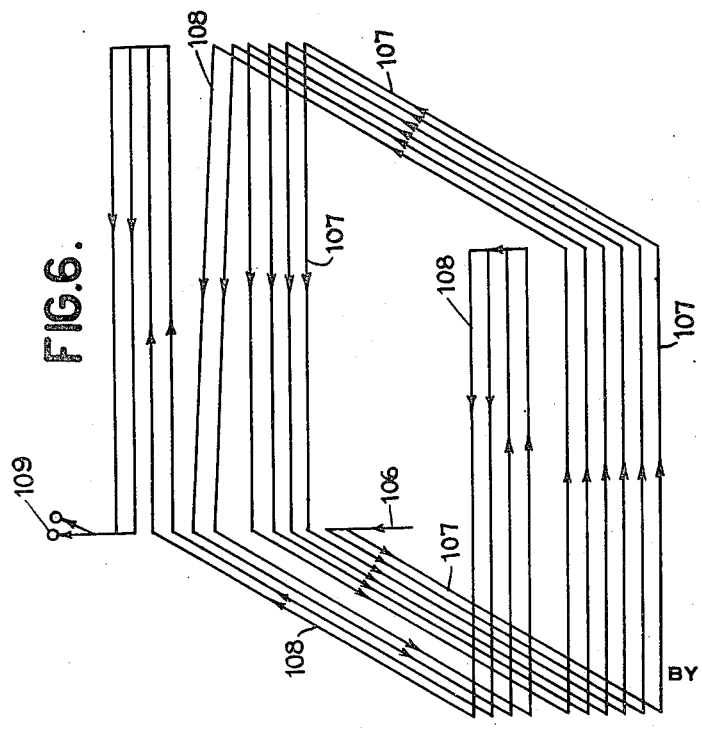

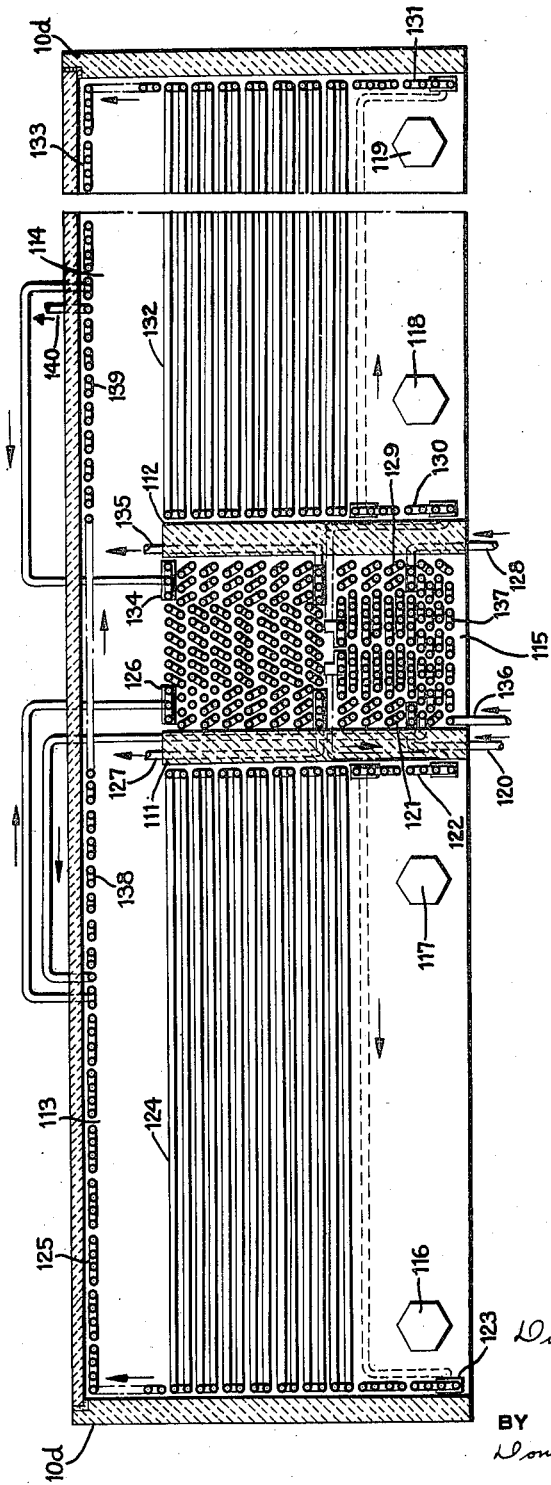

June 17, 1941.  D. W. WILSON  2,246,026
HEATING APPARATUS
Filed March 14, 1932  8 Sheets-Sheet 8

Dustin W. Wilson
INVENTOR-
BY Donald H. Mace
ATTORNEY-

Patented June 17, 1941

2,246,026

UNITED STATES PATENT OFFICE 2,246,026

HEATING APPARATUS

Dustin W. Wilson, Elizabeth, N. J., assignor to Gasoline Products Company, Inc., Newark, N. J., a corporation of Delaware Application March 14, 1932, Serial No. 598,792

13 Claims. (Cl. 196—50)

This invention relates to furnaces provided with radiant heating means and contemplates the provision of heating apparatus constructed with a plurality of combustion or fire chambers in order to furnish a greatly increased area of most effective heat absorbing surfaces. The major object of the invention is to provide a heating apparatus having a large area of most effective heat absorbing surfaces.

An equally important object of the invention is to provide a heating apparatus in which several streams of oil may be heated simultaneously and the temperature of each stream controlled by the provision of separate heating chambers therefor.

Another object of the invention is to provide a heating apparatus constructed as a single furnace having an oil heating duty in excess of anything previous.

With these and other objects in view, which may be incident to the improvement, the invention consists in the parts and combinations to be hereinafter set forth and claimed, with the understanding that the several necessary elements comprising the invention may be varied in construction, proportions and arrangement without departing from the spirit and scope of the appended claims.

The invention broadly contemplates a unitary furnace structure provided with a plurality of fire chambers, each of which supplies radiant heat to elements arranged within the furnace, and with a common convection chamber into which the furnace gases from the several fire chambers are directed.

The invention is particularly adapted for the heating of hydrocarbon oils and in this connection contemplates the provision of a maximum amount of radiant heating surface adapted for applying heat to the oil.

In order to make the invention more clearly understood, there is shown in the accompanying drawings, means for carrying the same into practical effect without limiting the improvements in their useful applications to the particular construction which, for the purpose of explanation, have been made the subject of illustration.

In the drawings:

Figure 1 is a diagrammatic sectional elevation of a particular embodiment of the invention showing heating means as applied to two separate streams of oil.

Figures 2 and 3 are diagrammatic sectional elevations of modified apparatus also shown as adapted for heating two separate streams of oil.

Figures 4 and 5 are left and right-hand views, respectively, in diagrammatic sectional elevation of another modification shown as applied to the heating of a single stream of oil.

Figure 6 is a flow diagram in perspective illustrating a portion of the radiant heating section shown in Figure 4.

Figure 7 is a flow diagram in perspective illustrating a portion of the radiant heating section shown in Figure 5.

Figures 8 and 9 are diagrammatic sectional elevations of particular embodiments of the invention showing heating means as applied to three separate streams of oil.

Figure 9:
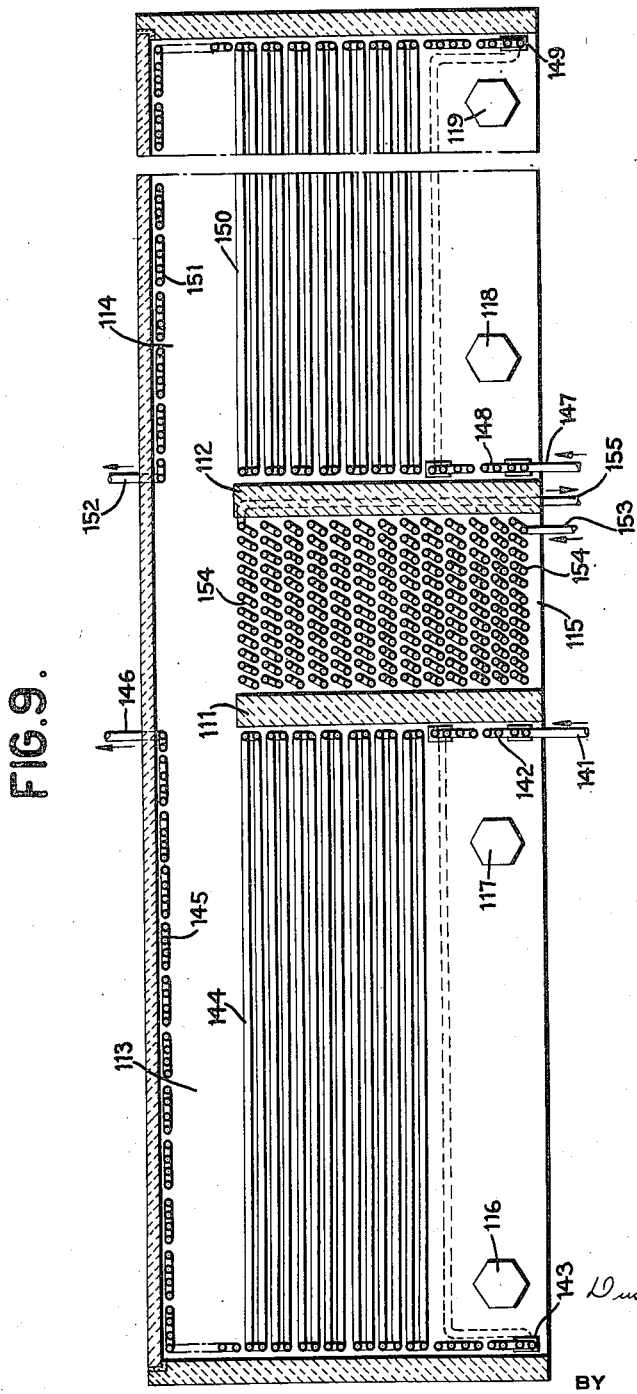

Referring to Figure 1, 10 indicates a furnace or refractory setting which may conveniently be of box or rectangular shape. The furnace is provided with bridge walls 11 and 12, which separate the furnace into combustion or fire chambers 13 and 14 and a convection heating section 15. Burners are indicated at 16 and 17, in the fire chamber 13, and at 18 in the fire chamber 14. A screen or baffle wall 19, which may be perforated, is placed intermediate the burners 16 and 17.

One stream of oil to be heated may be admitted through an inlet 20 to a coil or tubular section 21 located in the cooler section of the convection heating zone 15. The oil passes from the convection coil 21 to a coil comprising wall tubes 22 disposed about the walls of the fire chamber 14. The coil 22 may well be disposed about the four walls of the chamber consisting of one side of the bridge walls 11 and 12 and the side walls of the furnace. The heated oil passes from the coil 22 through a coil of roof tubes 23 adapted to receive radiant heat from the fire chamber 14, the oil being then discharged through outlet 24.

The other stream of oil is shown as being introduced to an inlet 25 to a convection heating coil 26 positioned in the hotter portion of the convection heating zone 15. The oil passes thence through an intermediate radiant tube section 27 disposed about the baffle 19. The oil is then directed through a row of wall tubes 28 disposed in the chamber 13 along the other side of the bridge wall 11 and passes thence through floor tubes 29 to wall tubes 30 disposed adjacent one of the walls 10 of the furnace. The oil then passes through a radiant heating coil 31 disposed about the four walls of the fire chamber 13 comprising the bridge wall 11 and three walls of the furnace 10. At the upper end of the bridge wall 11 the four-wall tube section is changed to a three-wall section 32, through which the oil passes to radiant roof tubes 33 and out through the outlet 34.

It is preferable to provide in addition to the burners 16, 17 and 18 corresponding burners entering from the opposite wall to that from which the burners 16, 17 and 18 enter. It is to be understood, however, that any number of burners may be employed without departing from the scope of the invention. It is contemplated that the flames of the burners are projected inwardly and that the combustion gases rise in combustion chamber 13 to flow over the bridge wall 11 to be there contacted with the combustion gases rising in the combustion chamber 14, the combined gases then passing into the convection section to flow over the tubes in that section and finally passing to a flue or chimney (not shown). Thus, all of the tubes disposed along the several surfaces, that is, the various wall tubes, floor tubes, roof tubes and the tubes adjacent the intermediate screen or baffle 19 are heated substantially by radiant heat while the tubes located in the chamber 15 are heated by convection heat.

The heating apparatus of Figure 1 may be employed for various purposes, such for example, in the cracking of hydrocarbon oils, in which case both of the separate streams may be subjected to cracking temperatures, or if desired only one of the streams may be brought to a cracking temperature while the other stream may be more moderately heated. In one exemplification of the invention contemplated, one of the streams is employed as a high temperature cracking stream wherein considerable cracking may take place for the production of gasoline while the other stream may be subjected to a more moderate temperature, such for example, as may be applied to a crude petroleum or residuum thereof for the purpose of enabling a moderate degree of cracking for the breaking or reducing of the viscosity of the oil. The discharge pipes 34 and 24 may be connected to suitable distilling apparatus or to such reaction chambers as may be desired.

In the apparatus shown in Figure 2, a furnace 10a is provided with bridge walls 11a and 12a to form fire chambers 13a and 14a and a convection chamber 15a. The fire chamber 13a is supplied with burners at 16a and 17a, while the fire chamber 14a is supplied with burners 18a. In one or more of the combustion chambers, such as is shown in the combustion chamber 13a, baffles or screens 19a, similar to the baffle 19, are disposed intermediate the several burners. The baffles or screens may conveniently be supported on pedestals 35.

The apparatus of Figure 2 is shown as applied to the heating of two separate streams of oil, one of which is heated entirely by radiant heat and the other of which is heated partly by radiant heat and partly by convection heat. Thus, one stream may be introduced through an inlet 36 to a row of wall tubes 37 adjacent the bridge wall 11a, thence to a section of floor tubes 38, thence to intermediate radiant tubes 39 disposed about the surfaces of one of the screens 19a, thence to another section of floor tubes 40, thence to another section of intermediate radiant tubes 41 disposed about the other screen 19a, thence to floor tubes 42 and thence to a row of side wall tubes 43 along one of the walls 10a. The oil then passes through a section of four-wall tubes 44 disposed about the four walls of the combustion chamber 13a, including the bridge wall 11a. At the upper end of the bridge wall the four-wall tubes are changed to a three-wall section 45, from which the oil passes finally through roof tubes 46 to an outlet 47. Each section, other than the roof, of the several sections of coil just mentioned is shown as provided for dual flow, that is, each section consists of pairs of pipes inter-connected so that the oil flows in two parallel streams through the several pairs of tubes of which each section is composed. If desired, however, the arrangement may be such that there is single flow entirely through all of the several coils. The stream thus introduced at the inlet 36 may be substantially entirely heated by radiant heat.

The other stream of oil enters through an inlet 48 through a coil section 49 positioned in a cooler section of the convection zone 15a, passes thence to a coil section 50 positioned in the hottest portion of the convection section 15a. The coil section 50 may advantageously, although not necessarily, consist of only a comparatively small section of coil, such as the two rows indicated, and may form a screening section through which relatively low temperature oil may be passed to thus protect the subsequent rows immediately underneath through which oil at a higher temperature may pass. The oil passes from the coil 50 to wall tubes 51 disposed adjacent the bridge wall 12a, thence through floor tubes 52, thence through a row of wall tubes 53 adjacent the bridge wall 11a, thence through a four-wall section of tubes 54 which are disposed about the walls of the combuston chamber 14a, including the bridge walls 11a and 12a and the side walls of the furnace. The oil then passes through a section of roof tubes 55 and finally through a coil section 56 disposed in an intermediate portion of the convection zone 15a and is finally discharged through an outlet 57. The flow of oil of this second stream is also shown to be dual.

While the apparatus of Figure 2 may be employed for various purposes one advantageous application of this apparatus is in the carrying on of a combined crude reducing or a viscosity breaking operation with a cracking operation for the production of cracked gasoline. Thus, for example, a heavy crude or reduced crude, which it is desired to skim or strip or to crack to a comparatively slight extent, such as in a mere viscosity breaking operation, may be introduced through the inlet 48 and passed through the several sections of the coil positioned in the radiant heating zones of the fire chamber 14a and in the convection zone 15a, the oil being then discharged through outlet 57 for distillation, while a cycle condensate obtained in the process may be passed to the inlet 36 and passed through the several sections of radiant heat coils disposed about the several walls of the fire chamber 13a wherein the oil is cracked to the desired degree and may then be discharged through the pipe 47 into a reaction chamber for further cracking or passed directly to suitable distilling apparatus.

In the apparatus shown in Figure 3, there is a furnace 10b provided with bridge walls 11b and 12b to thus form fire chambers 13b and 14b, and a convection chamber 15b, the fire chamber 13b being supplied with burners at 16b and 17b and fire chamber 14b being supplied with burner at 18b.

One stream to be heated may be admitted by an inlet line 58 to a coil section 59 positioned in a cooler section of the convection heating zone 15b. The oil passes thence through a section of wall tubes 60 disposed in the fire chamber 13b adjacent the bridge wall 11b, thence through floor tubes 61, thence through a row of tubes 62 adjacent the wall 10b, thence through roof tubes 63, thence through a section of coil 64 disposed in an intermediate section of the convection heating zone 15b and is finally discharged through an outlet line 65.

The other stream of oil may enter through an inlet pipe 66 to a row of wall tubes 67 disposed in the fire chamber 14b adjacent the bridge wall 12b, thence to another section of wall tubes 68 adjacent the bridge wall 11b, thence through roof tubes 69, thence through a coil section 70 disposed in the hotter section of the convection zone 15b, the oil being finally discharged through outlet pipe 71.

The flow of oil through the several sections of coil shown in the apparatus of Figure 3 is indicated as being in dual streams through each section, that is, each section of pipe is shown as consisting of pairs of tubes inter-connected in series.

One advantageous operation that may be carried on with the apparatus of Figure 3 is to conduct a combined vacuum distillation and atmospheric or superatmospheric pressure distilling operation. Thus, the stream for the vacuum distilling unit may advantageously be introduced through the line 66 and discharged by the line 71 to the vacuum flashing or distilling chamber while the other stream may be admitted through the line 58 and discharged through the line 65 to suitable distilling apparatus operating under atmospheric or superatmospheric pressure.

In Figures 4 and 5, a furnace or refractory setting 10c is provided with bridge walls 11c and 12c to form combustion chambers 13c and 14c and a convection heating section 15c. The fire chamber 13c is supplied with burners at 16c and 17c and the fire chamber 14c is supplied with burners at 18c. Intermediate the several burners 16c and 17c in the fire chamber 13c are baffles or screens 19c, which may be suitably supported on pedestals 35c. Intermediate the several burners 18c in the fire chamber 14c are baffles or screens 72, which may be suitably supported on pedestals 73.

The stream of oil to be treated in the apparatus of Figures 4 and 5 enters through an inlet line 74 to a section of coil 75 positioned in the convection heating zone 15c. The flow of oil through the coil 75 is indicated as being in quadruplet. The oil passes from the coil 75 through a connecting line 75' having branches 76, 77, 78 and 79. The oil in branch line 76 passes to a side wall section of tubes 80 in the combustion chamber 14c adjacent the bridge wall 12c, thence through floor tubes 81, thence through tubes 82 disposed along the surfaces of one of the baffles 72, thence through an additional section of floor tubes 83 to a transfer line 84. The stream of oil entering the branch line 77 passes through wall tubes 85 in the fire chamber 14c adjacent one side of the bridge wall 11c, thence through floor tubes 86, thence through a section coil 87 disposed about the other baffle 72, thence through floor tubes 88 to a transfer line 89. The oil entering the pipe 78 passes through wall tubes 90 disposed along the other side of the bridge wall 11c in the combustion chamber 13c, thence through floor tubes 91, thence through tubes 92 disposed along the surface of one of the intermediate screens 19c and thence through additional floor tubes 93 to a transfer line 94. The oil entering the other branch line 79 passes through wall tubes 95 adjacent one of the outer walls 10c, thence through floor tubes 96, thence through tubes 97 disposed along the surface of the other intermediate screen 19c, thence through floor tubes 98 to transfer line 99.

The streams in the transfer lines 84 and 89 are merged in a line 100 for delivery to a four-wall coil section 101 disposed about the walls in the fire chamber 14c, including the bridge walls 11c and 12c and the side walls of the furnace, the oil flowing in dual flow through the coil 101. The oil then passes in dual flow through a three-wall section 102 along the surfaces of the combustion chamber 14c, including the bridge wall 11c and the side walls of the furnace. The oil then passes to a two-wall section 103, one of the dual streams of oil from the coil 102 passing through one of the side wall coils 103 and the other stream passing through the other side wall coil 103, these side wall coils being located on opposite furnace walls in the fire chamber 14c. The oil finally passes to roof tubes 104 in dual flow and thence to an outlet pipe 105.

The streams of oil in the lines 94 and 99 are merged in the line 106 by which they are conducted to a four-wall coil 107 disposed about the walls of the fire chamber 13c, including three walls of the furnace and the bridge wall 11c. The oil passes thence through a three-wall section of coil 108 disposed about the three walls of the furnace. Finally the oil passes through roof tubes 109 to outlet 110. The flow of oil through each of the coils 107, 108 and 109 is shown in dual flow.

The apparatus illustrated in Figures 4 to 7 is particularly adapted for the cracking of hydrocarbon oils, and it is contemplated that the oil at cracking temperature may be delivered through the transfer lines 105 and 110 to a suitable reaction vessel or to a suitable distilling apparatus or both.

In the apparatus shown in Figures 8 and 9, there is a furnace 10d provided with bridge walls 111 and 112 to form fire chambers 113 and 114 and a convection chamber 115. The fire chamber 113 is supplied with burners at 116 and 117 and the fire chamber 114 is supplied with burners at 118 and 119.

The apparatus of Figure 8 is shown as applied to the heating of three streams of oil, all three of which are heated partly by radiant heat and partly by convection heat.

One stream of oil to be heated may be admitted by an inlet pipe 120, then passed to a coil section 121 positioned in a part of a cooler section of the convection heating zone 115. The stream then passes through a section of wall tubes 122 disposed in the fire chamber 113 adjacent the wall 111, thence to another section of wall tubes 123 and thence to a radiant heating coil 124 disposed about the four walls of the fire chamber 113, comprising the bridge wall 111 and three walls of the furnace 10d. The oil then passes through radiant roof tubes 125, thence through a section of coil 126 disposed in a part of a hotter section of the convection zone 115 and is finally discharged through an outlet pipe 127.

The tubes in the convection zone 115, just described, extend from the bridge wall 111 to approximately the center of the convection zone. Corresponding portions of the convection zone 115 from the bridge wall 112 to the center of the convection zone receive tubes now to be described.

The second stream of oil may enter through an inlet pipe 128, then passed to a coil section 129 positioned in the other part of the cooler section of the convection zone 115. The oil then passes through a section of wall tubes 130 disposed in the fire chamber 114 adjacent the bridge wall 112, thence through another section of wall tubes 131 and thence to a radiant heating coil 132 disposed about the four walls of the fire chamber 114, comprising the bridge wall 112 and three walls of the furnace 10d. The oil then passes through radiant roof tubes 133, thence through a section of coil 134 disposed in the other part of the hotter section of the convection zone and is discharged through an outlet pipe 135.

The tubes above described as being in the convection zone 115 provide an arrangement whereby each stream of oil may be heated by convection heat independently of the other. As is shown, the coil section 121 and the coil section 129 extend to the center of the convection zone 115 and consist of the same number of tubes. The same is true of the coil sections 126 and 134. By this arrangement it is possible to divide the convection zone 115 vertically into two sections for heating a different stream of oil in each section. Thus, it will be seen that different streams of oil entering the inlets 120 and 128 are subjected to the same heating in the convection zone 115 and may be heated to any desired temperature in the radiant heating zones or fire chambers 113 and 114.

While the coil sections 121 and 129 and the coil sections 126 and 134 have been shown and described as consisting of the same number of tubes and occupying corresponding portions of the convection zone, it is to be understood that this invention is not limited to this arrangement. Each section of coil may be arranged in a manner best suited for subjecting a plurality of streams of oil to different temperatures.

The third stream of oil to be heated may be admitted through an inlet pipe 136 and thence to a coil section 137 positioned in a cooler section of the convection heating zone. The oil then passes through radiant roof tubes 138 disposed in the radiant heating zone 113, thence through similar radiant roof tubes 139 in the radiant heating zone 114 and is discharged through an outlet line 140.

The coil sections 137, 138 and 139 are shown as connected for single flow; the coil sections 122 to 125 and 129 to 133, both inclusive, are shown as connected for dual flow; and the coil sections 126 and 134 are shown as connected for triple flow. Obviously this manner of arranging the tubes of the various coil sections may be varied without departing from the spirit of the invention.

The apparatus shown in Figure 8 may be employed for various purposes. For instance, crude oil or a reduced crude may be introduced into the inlet pipe 120 and raised to a high or cracking temperature in the fire chamber 113. A cycle condensate obtained from a cracking operation may be introduced into the inlet pipe 128 and also raised to a high or cracking temperature. Into the inlet pipe 136, naphtha or gasoline may be introduced and subjected to convection heat in the convection zone 115 and then subjected to radiant heat in the roof tubes 138 and 139 in the radiant heating zones 113 and 114. The temperature of the naphtha or gasoline leaving the outlet 140 may be governed by regulating its flow through the heating coils thereby obtaining reformation of the gasoline or naphtha. It is to be understood that this invention is not limited to the above method of operation. The invention broadly comprehends introducing three streams of oil into a furnace, governing the temperature of two of the streams by regulating the heat produced by the burners in the radiant heating zones and governing the temperature of the third stream of oil by regulating the quantity of flow through the coil in the convection zone.

The heated streams of oil discharged through the outlet pipes 127, 135 and 140 may be passed to any suitable apparatus where further treatment thereof may be carried out.

The apparatus of Figure 9 is shown as applied to the heating of three streams of oil, two of which are heated by radiant heat in the fire chambers 113 and 114 and the third of which is heated solely by convection heat in the convection heating zone 115.

One stream of oil to be heated may be admitted by an inlet pipe 141, then passed to a section of wall tubes 142 positioned in the fire chamber 113 adjacent the bridge wall 111, thence to another section of wall tubes 143 and thence to a radiant heating coil 144 disposed about the four walls of the fire chamber 113 comprising the bridge wall 111 and three walls of the furnace 10d. The oil then passes through radiant roof tubes 145 and thence out through an outlet pipe 146.

A second stream of oil to be heated follows the same path through the fire chamber 114. The second stream may be admitted by an inlet pipe 147 then passed to a section of wall tubes 148 positioned in the fire chamber 114 adjacent the bridge wall 112, thence to another section of wall tubes 149 and thence to a radiant heating coil 150 disposed about the four walls of the fire chamber 114, comprising the bridge wall 112 and three walls of the furnace 10d. The oil then passes through radiant roof tubes 151 and thence out through an outlet pipe 152.

A third stream of oil may be heated entirely in the convection zone 115. This third stream may be admitted through an inlet pipe 153, thence through a coil section 154, positioned between the bridge walls 111 and 112 and thence out through an outlet pipe 155.

One method of operating the apparatus shown in Figure 9 is to introduce a heavy oil into the inlet pipe 141. The oil is then raised to a high or cracking temperature in the fire chamber 113 and is discharged through the outlet pipe 146. A light oil may be introduced into the inlet pipe 147, raised to a high or cracking temperature in the fire chamber 114 and then discharged through the outlet pipe 152. The two streams of oil leaving the outlet pipes 146 and 152 may be passed to any suitable distillation or cracking apparatus or both, where the contemplated methods of treating the two streams of oil is consummated.

A third stream of oil, such as reduced crude, may be introduced into the inlet pipe 153 and passed through the coil section 154 positioned in the convection zone 115. The oil passing through the coil section 154 may be raised to a temperature sufficiently high to accomplish viscosity breaking thereof. The temperature of the oil may be governed by regulating the quantity flowing through the tubes. The heated oil is then discharged through the outlet pipe 155 to any suitable apparatus for further treatment, or if desired, to storage.

With the arrangement shown in Figures 8 and 9, three streams of fluid may be heated to different temperatures to carry out any desired operation for each stream. Or if desired two of the streams may be heated to the same temperature and the third stream to a different temperature.

The baffles or screens positioned in the fire chambers for supporting additional heating coils, may be perforated if desired. By perforating the baffles or screens, it is possible for the hot gases of combustion to pass through the sections of coil positioned adjacent the surfaces of the baffles or screens. By this expedient, additional heating of the oil passing through these sections of coil may be accomplished.

An important feature of the invention is the provision of unitary heating apparatus of maximum capacity. This feature is particularly exemplified in the apparatus of Figures 4 to 7 in which a furnace structure is provided of considerably greater capacity than has hitherto been possible.

It is contemplated that in the apparatus shown, additional burners may be provided as on the opposite walls from those in which the burners are placed. In the several structures shown in these several figures the various radiant heating tubes located adjacent the interior surfaces of the fire chambers are preferably placed substantially out of the path of the convection gases so that they may not be subjected to direct convection heat in the fire chambers and are heated by the radiant heat afforded by the several burners in the fire chambers. It is contemplated that the furnace gases after being passed from the fire chambers to one of the convection zones and after flowing over the elements to be heated therein may be passed to a suitable flue or chimney, not shown. In one method of operation contemplated by the invention, the convection heating section may be eliminated and the furnace gases which are discharged from the fire chambers may be employed in preheating the air supply to the burners.

The separate control of the degree of radiant heat applied in the several radiant heating zones provided by the invention is an advantageous feature thereof, particularly in the case of cracking operations. Thus, the oil stream passing through the furnace may be rapidly raised to a cracking temperature and the soaking heat required in the final sections of the coil may be very accurately controlled in accordance with my invention.

An important method of operation contemplated by the invention is to heat separate streams of oil which may have different characteristics requiring different degrees of heat for cracking in separately controlled radiant heating sections. Thus for example, in the apparatus of Figure 1, one stream of oil after preferably being preheated in the convection coil 26 may be passed through the radiant conduits positioned in the fire chamber 13 while another stream of oil after being preferably preheated in the convection coil 21 may be passed through the radiant heating conduits of the fire chamber 14, the fire chambers 13 and 14 being separately controlled so that the desired cracking temperature may be applied in each instance. The two separate streams of oil may be derived from various sources, thus, one stream may be raw charging stock while the other may be cycle condensate obtained in the process or both streams may be withdrawn from the fractionating zone of the system but removed from different points therein. In the apparatus of Figures 4 and 5, for example, two cuts may be withdrawn from the fractionating zone, one cut being passed through the radiant heating conduits of the fire chamber 13c while the other stream may be passed through the radiant heating conduits of the fire chamber 14c or if desired a greater number of cuts of varying boiling points may be withdrawn from the fractionating zone and passed through separately controlled radiant heating zones of the furnace.

It is to be understood that this invention comprehends that the tubes may function to shield a part or all of the interior surfaces of the furnace adjacent which they are positioned to such an extent that they will radiate little or no heat, although if desired, the arrangement may be such that the walls may function as heat radiating or reflecting surfaces.

While there is shown and described the preferred embodiments of the invention and specific examples of operation for each, it is to be clearly understood that the invention is not to be limited by the precise details of construction herein set forth, by way of illustration, as it is apparent that many changes and variations may be made therein, by those skilled in the art, without departing from the spirit of the invention, or exceeding the scope of the appended claims.

I claim:

1. A heating apparatus of the character described comprising a plurality of separately fired fire chambers, a convection chamber for receiving hot gases of combustion from said fire chambers, a coil for heating a stream of fluid passing therethrough and extending through a portion of the convection chamber and along the walls of one of the fire chambers, a second coil for heating another stream of fluid passing therethrough and extending through another portion of the convection chamber and along the walls of another fire chamber and a third coil for heating another stream of fluid passing therethrough and extending through another portion of the convection zone and each of said fire chambers.

2. The method of heating a plurality of streams of oil in a unitary heating apparatus which comprises introducing one stream of oil into a portion of a convection heating zone and passing said stream of oil into a separately fired radiant heating zone, introducing a second stream of oil into another portion of the convection heating zone and passing said second stream into another separately fired radiant heating zone, and introducing a third stream of oil into still another portion of the convection heating zone and subjecting said third stream to radiant heat in both of the radiant heating zones.

3. A unitary furnace for heating hydrocarbon fluids which comprises a plurality of separately fired fire chambers, separate interconnected conduit elements forming separate coils for conveying hydrocarbon fluid being heated disposed in each of said fire chambers and adapted to be heated preponderantly by radiant heat from furnace gases therein, a convection heating chamber connected to and disposed between said fire chambers to receive furnace gases therefrom, conduit elements disposed in said convection chamber and connected to form a plurality of separate coils therein, separate means connecting a separate coil in each of said separately fired fire chambers to a separate coil in said convection chamber and other means connecting another separate coil in at least one of the fire chambers to another of the separate coils in said convection chamber.

4. A unitary furnace for heating hydrocarbon fluids which comprises a plurality of separately fired fire chambers defined by walls, roof and a floor, separate heating coils for conveying hydrocarbon fluid being heated separately disposed, respectively, on the walls and roof in each of said fire chambers and adapted to be heated preponderantly by radiant heat from furnace gases therein, a convection chamber connected to and disposed to receive furnace gases from each of said fire chambers, a plurality of separate heating coils in said convection heating chamber for conveying a separate stream of hydrocarbon fluid through each, means connecting a heating coil disposed on the walls in each of said fire chambers to a separate heating coil in said convection heating chamber and means also connecting the heating coil disposed on the roof in at least one of the fire chambers to another separate coil in said convection heating chamber.

5. A unitary furnace for heating hydrocarbon fluids which comprises a plurality of separately fired fire chambers, each of which is defined by walls, a roof and a floor, a separate heating coil for conveying hydrocarbon fluid being heated comprising a plurality of separate interconnected heat absorbing tubes disposed along the walls of each of said fire chambers and adapted to be heated preponderantly by radiant heat from furnace gases therein, a convection heating chamber connected to and disposed to receive furnace gases from each of said fire chambers, and a separate heating coil in said convection heating chamber having an extension in each of said fire chambers, each of said aforementioned heating coils being adapted to convey a separate stream of hydrocarbon fluid therethrough.

6. The method of heating a plurality of streams of oil in a unitary heating apparatus which comprises introducing one stream of oil into a heating apparatus and heating it in a separately fired heating zone preponderantly by radiant heat mainly from furnace gases produced therein, conducting the thus heated oil into a convection heating zone wherein convection heat is imparted thereto, introducing another stream of oil into the convection heating zone wherein convection heat is imparted thereto and passing said last mentioned stream into another separately fired heating zone separated and apart from the aforementioned heating zone wherein it is further heated preponderantly by radiant heat mainly from other furnace gases produced therein, the convection heat for said convection heating zone being derived from furnace gases received from said separately fired heating zones.

7. The method of heating a plurality of streams of oil in accordance with claim 6 wherein the last mentioned stream of oil is conducted from the separately fired heating zone through which it passes to said convection heating zone wherein it is further heated by convection heat.

8. The method of heating a plurality of streams of oil in a unitary heating apparatus which comprises introducing one stream of oil into a convection heating zone wherein convection heat is imparted thereto, passing said stream to a separately fired radiant heating zone and conducting it through tubes along the walls thereof and heating said stream in passing through said radiant heating zone preponderantly by radiant heat mainly from furnace gases produced therein, conducting the thus heated oil to the convection heating zone, introducing a second stream into the convection heating zone wherein convection heat is imparted thereto, passing said stream to another separately fired radiant heating zone separated and apart from the aforementioned radiant heating zone and conducting it through tubes along the walls thereof and heating said second stream in passing through the last-mentioned radiant heating zone preponderantly by radiant heat mainly from furnace gases produced therein, the convection heat for said convection heating zone being derived from furnace gases received from said separately fired radiant heating zones.

9. The method of heating a plurality of streams of oil in a unitary heating apparatus which comprises introducing one stream of oil into a convection heating zone wherein convection heat is imparted thereto, passing said stream to a separately fired radiant heating zone and conducting it through tubes along the walls and roof thereof and heating said stream in passing through said radiant heating zone preponderantly by radiant heat mainly from furnace gases produced therein, conducting the thus heated oil to the convection heating zone, introducing a second stream into the convection heating zone wherein convection heat is imparted thereto, passing said stream to another separately fired radiant heating zone separated and apart from the aforementioned radiant heating zone and conducting it through tubes along the walls and roof thereof and heating said second stream in passing through the last-mentioned radiant heating zone preponderantly by radiant heat mainly from furnace gases produced therein, the convection heat for said convection heating zone being derived from furnace gases received from said separately fired radiant heating zones.

10. The method of heating a plurality of streams of oil in accordance with claim 8 wherein the stream of oil is conducted from the last-mentioned separately fired radiant heating zone to the convection heating zone wherein additional heat is imparted thereto.

11. The method of heating a plurality of streams of oil in a unitary heating apparatus which comprises introducing one stream of oil into a convection heating zone wherein convection heat is imparted thereto, passing said stream to a separately fired radiant heating zone and conducting it through tubes along the walls thereof and heating said stream in passing through said radiant heating zone preponderantly by radiant heat mainly from furnace gases produced therein, passing said stream of oil from said radiant heating zone to said convection heating zone wherein additional convection heat is imparted thereto, introducing a second stream of oil directly into another separately fired radiant heating zone separated and apart from the aforementioned radiant heating zone and conducting it through tubes along the walls thereof and heating said second stream in passing through the last mentioned radiant heating zone preponderantly by radiant heat mainly from furnace gases produced therein, passing said second stream from said last mentioned radiant heating zone to said convection heating zone wherein additional convection heat is imparted thereto, the convection heat for said convection heating zone being derived from furnace gases received from said separately fired radiant heating zones.

12. The method of heating a plurality of streams of oil in a unitary heating apparatus which comprises introducing one stream of oil into a convection heating zone wherein convection heat is imparted thereto, passing said stream to a separately fired radiant heating zone and conducting it through tubes along the walls thereof and heating said stream in passing through said radiant heating zone preponderantly by radiant heat mainly from furnace gases produced therein, introducing a second stream into the convection heating zone wherein convection heat is imparted thereto, passing said stream to another separately fired radiant heating zone separated and apart from the aforementioned radiant heating zone and conducting it through tubes along the walls thereof and heating said second stream in passing through the last-mentioned radiant heating zone preponderantly by radiant heat mainly from furnace gases produced therein, and passing a third stream of oil through said convection heating zone and conducting the third stream of oil through part of each of the radiant heating zones to be therein heated preponderantly by radiant heat, the convection heat for said convection heating zone being derived from furnace gases received from said separately fired radiant heating zones.

13. In a furnace having a plurality of combustion sections and a communicating convection heat section through which combustion gases from the combustion sections are passed thereby forming in the convection section a zone of high rate of heating and a zone of lower rate of heating, the combination of a fluid conduit in each of the combustion sections, a tube bank in the convection section and having tubes in both said zones, means for passing two parallel streams of fluid through the tubes in said zone of lower rate of heating and for then passing one of said streams of fluid through said conduit in one combustion section and for passing the other stream through said conduit in another combustion section and at least through some of the tubes in said zone of high rate of heating.

14. In the heating of hydrocarbon oils to conversion temperatures, the method which comprises passing a relatively heavy oil first through a convection section and thence through a radiant heat section of a furnace wherein radiant heat is generated and subjecting the same during such flow to a high rate of heating, simultaneously passing a lighter oil through a second radiant heat section in said furnace wherein radiant heat is generated for heating the lighter oils, then passing the lighter oil through said convection section of the furnace, and passing combustion gases from both said radiant heat sections in indirect heat exchange relation with the oils in the convection section.

15. In the heating of hydrocarbon oils to conversion temperatures, the method which comprises passing a relatively heavy oil first through a convection section and thence through a radiant heat section of a furnace wherein radiant heat is generated for heating the relatively heavy oil, simultaneously passing a lighter oil through a second radiant heat section in said furnace wherein radiant heat is generated for heating the lighter oil, then passing the lighter oil through said convection section of the furnace, and passing combustion gases from both said radiant heat sections in indirect heat exchange relation with the oils in the convection section.

16. A process of heating hydrocarbon oils comprising the steps of burning fuel in a first combustion zone to generate radiant heat and hot gases of combustion, independently burning fuel in a second lower temperature combustion zone to generate radiant heat and hot gases of combustion, separately withdrawing the hot gases from each combustion zone, tempering the gases withdrawn from the first combustion zone by commingling them with the cooler gases withdrawn from the second combustion zone, simultaneously passing hydrocarbon oil in an elongated confined stream through the zone containing the tempered commingled gases to thereby heat the oil mainly by the convection heat of the gases and then passing the oil in a confined stream through the combustion zones of successively higher temperature to thereby progressively heat the oil mainly by the radiant heat generated in each.

17. In a furnace having a pair of independently fired combustion zones, and a convection zone adapted to receive furnace gases from said combustion zones, the combination of a plurality of heating tubes in said convection zone forming a plurality of coils for the passage of separate streams of fluids, a plurality of heating tubes in each of said combustion zones forming a continuous heating coil therein having a section thereof adjacent the walls and adjacent the roof, means for connecting a separate coil in said convection zone with the heating coil in one of said combustion zones for the passage of a separate stream of fluid therethrough, means for connecting another separate coil in the convection zone with the heating coil in the other of said combustion zones for the passage of another separate stream of fluid therethrough and other means for connecting a heating coil in at least one of said combustion zones with still another separate coil in said convection zone.

18. In the heating of hydrocarbon oils to conversion temperatures in furnaces having a pair of independently fired combustion and radiant heat zones provided with fluid conduits and a convection heating zone receiving combustion gases from both said combustion zones and having tubes in the path of flow of the combustion gases some of which tubes are in a zone of lower rate of heating and some of which are in a zone of higher rate of heating, the method which comprises passing a relatively light oil and a heavier oil in separate parallel streams through tubes in said zone of lower rate of heating, passing the light oil through fluid conduits in one of said combustion zones and through tubes in said zone of higher rate of heating and passing the heavier oil directly from said tubes in the zone of lower rate of heating through fluid conduits in the other of said combustion zones.

DUSTIN W. WILSON.